US007008216B2

(12) United States Patent
Fukushima

(10) Patent No.: US 7,008,216 B2
(45) Date of Patent: Mar. 7, 2006

(54) MOLDING DIE APPARATUS, METHOD FOR MOLDING DISC SUBSTRATE, AND DISC-SHAPED RECORDING MEDIUM

(75) Inventor: Yoshihito Fukushima, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/950,852

(22) Filed: Sep. 12, 2001

(65) Prior Publication Data

US 2002/0031078 A1 Mar. 14, 2002

(30) Foreign Application Priority Data

Sep. 14, 2000 (JP) ........................... P2000-280629

(51) Int. Cl.
*B29D 11/00* (2006.01)

(52) U.S. Cl. ....................... 425/556; 425/443; 425/810

(58) Field of Classification Search ................ 425/190, 425/556, 440, 443, 810; 264/106, 107
See application file for complete search history.

(56) References Cited

U.S. PATENT DOCUMENTS 4,118,168 A * 10/1978 Rees et al. .................. 425/556
5,018,962 A * 5/1991 Kitamura et al. ........... 425/556
5,171,585 A * 12/1992 Onisawa et al. ........ 425/192 R
5,427,520 A * 6/1995 Shimizu et al. ............. 425/556

FOREIGN PATENT DOCUMENTS

| | | | |
|---|---|---|---|
| EP | 0 338 906 | | 10/1989 |
| JP | 08-90613 | * | 4/1996 |
| JP | 09-123229 | * | 5/1997 |

OTHER PUBLICATIONS

Computer translation of Japanese Pub. No. 09-123999.*
Patent Abstracts of Japan vol. 1997, No. 09, Sep. 30, 1997 & JP 09 123229 A (Sony Corp), May 13, 1997.
Patent Abstracts of Japan vol. 1996, No. 08, Aug. 30, 1996 & JP 08 090613 A (Taiyo Yuden Co Ltd), Apr. 9, 1996.

* cited by examiner

*Primary Examiner*—Donald Heckenberg
(74) *Attorney, Agent, or Firm*—Frommer Lawrence & Haug LLP; William S. Frommer

(57) ABSTRACT

Preventing a molded disc substrate from generating a separation pattern. To this end, a molding die 1 includes a pair of stationary die 6 and movable die 7, and an outer circumference ring 16 for molding an outer circumference end of the disc substrate 2. The outer circumference ring 16 is so mounted as to be movable along forward and backward directions in parallel with a moving direction of the movable die 7 toward the stationary die 6, and has a retaining surface 39 for retaining the outer circumference of the molded disc substrate 2.

10 Claims, 11 Drawing Sheets

MOLDING DIE APPARATUS, METHOD FOR MOLDING DISC SUBSTRATE, AND DISC-SHAPED RECORDING MEDIUM

BACKGROUND OF THE INVENTION

1. Field of the Invention

The present invention relates to a molding die apparatus for molding a disc substrate of a disc-shaped recording medium such as an optical disc and magneto-optical disc by injection molding, a method for molding a disc substrate, and a disc-shaped recording medium.

2. Description of the Related Art

Generally, a disc substrate or a basal plate of a disc-shaped recording medium such as an optical disc and magneto-optical disc is molded by injection molding by the use of a molding die.

Such a molding die is required to suppress generation of burrs around the outer circumference of a molded disc substrate, and to give off gas uniformly when a disc substrate is being molded.

The molding die includes a pair of stationary die and movable die which have a cavity for molding a disc substrate, an outer circumference ring for molding an outer circumference end of a disc substrate, a stamper for transcribing predetermined convexo-concave patterns onto a disc substrate, a driving means for moving the movable die toward and away from the stationary die.

There is formed a stationary side mirror-finished surface at the stationary die on which the stamper is to be mounted. On the other hand, there is formed a movable side mirror-finished surface (referred to as a molding surface, hereinafter) at the movable die, which molds a main surface of a disc substrate. And, there is mounted the outer circumference ring on the outer circumference of the molding surface of the movable die such that the outer circumference ring can move toward the cavity substantially in parallel with the moving direction of the movable die.

The stamper is of a disc-shaped configuration having a center hole, and is abutted to the stationary side mirror-finished surface of the stationary die. The stamper has its inner circumference fixed by an inner stamper holder and has its outer circumference fixed by an outer stamper holder, respectively.

The outer circumference ring is substantially of a ring-shaped configuration, and there is formed a molding surface for molding an outer circumference end of a disc substrate on the inner circumference thereof. The outer circumference ring is moved by an elastic body such as a spring, or a moving means using air pressure, oil pressure, etc.

As shown in FIG. 1, when a movable die 107 is moved toward a stationary die 106 and a molding die having the stationary die 106 and movable die 107 is clamped, there is formed a cavity 108 enclosed by a molding surface 126 of the movable die 107, a main surface of a stamper 113 abutted to the stationary die 106, and a molding surface 135 of an outer circumference ring 116, which space is to be filled with resin material.

At the time of clamping (closing) the molding die, the outer circumference ring 116 is moved toward the stationary die 106 with a predetermined pressure. The molding die is configured such that, when the outer circumference of the outer circumference ring 116 is abutted to an outer stamper holder 115, there is secured a clearance gap 120 for evacuating gas in the cavity 108 between the outer circumference ring 116 and the stamper 113. The clearance gap 120 is designed to have a predetermined size, which size can evacuate only gas in the cavity 108.

When injecting molten resin material into the cavity 108, air in the cavity 108 and gas generated from the molten resin material is evacuated from the clearance gap 120. On filling the cavity 108 with molten resin material, the injection of molten resin material is terminated. At the time of injecting molten resin material, only air and gas is evacuated from the clearance gap 120, and molten resin material is prevented from flowing into the clearance gap 120 so as to suppress generation of burrs at a molded disc substrate.

In injecting molten resin material into the cavity 108, in case the injection pressure is larger than the clamping force, the interval between the stationary die 106 and the movable die 107 is caused to be large. On the other hand, the pressure for causing the outer circumference ring 116 to protrude into the cavity 108 is being kept applied. So, the clearance gap 120 will not be expanded, and generation of burrs can be suppressed.

After completing the injection of molten resin material and cooling down the resin material, opening of the molding die is initiated. At this time, the molded disc substrate is moved together with the molding surface 126 of the movable die 107.

Then, the molded disc substrate is separated from the molding surface 126 of the movable die 107 by sleeve-shaped extruding pins (not shown) and ejected. Thus, the whole molding process composed of a series of molding steps is completed.

After opening the molding die, when the molded disc substrate is separated from the molding surface 126 of the movable die 107, it depends on the configuration of the molding die or molding condition whether the whole main surface of the disc substrate is attached to or released from the molding surface 126 of the movable die 107.

In case the whole main surface of the disc substrate is attached to the molding surface 126 of the movable die 107, separation resistance is prone to be large when the disc substrate is ejected. So, for example, an assistant means for supplying air is used to compulsorily separate the disc substrate. However, it is difficult to spray air upon the whole main surface of the disc substrate uniformly. That is, air is undesirably sprayed upon the center portion of the disc substrate partially where air can easily flow, which results in ill-balanced separation of the disc substrate. So, it is required that, after the molding die is opened, the whole main surface of the disc substrate is released uniformly from the molding surface 126 of the movable die 107.

However, when the outer circumference ring 116 is moved such that it further protrudes into the cavity 108 from the molding surface 126 of the movable die 107, in case a pressure caused by the outer circumference ring 116 is not transmitted to the disc substrate, the whole main surface of the disc substrate cannot be released from the molding surface 126 of the movable die 107.

In reality, in case a disc substrate (to be indicated with a reference numeral of 102) is molded using a molding die having the outer circumference ring 116 shown in FIG. 1, a pressure caused by the outer circumference ring 116 cannot be transmitted to the disc substrate sufficiently. So, the outer circumference of the disc substrate is unstably released, and the inner circumference of the disc substrate remains abutted to the molding surface 126 of the movable die 107. Thus, there arises a problem that a separation pattern 122 is generated between the outer circumference and the inner circumference of the disc substrate 102, as shown in FIG. 2. That is, only the outer circumference ring 116 protrudes toward the side of the disc substrate 102, and the inner and middle circumference of the disc substrate 102 remain abutted to the molding surface 126 of the movable die 107, and thus the separation pattern 122 is generated.

Thus molded disc substrate 102 with the separation pattern 122 not only spoils the beauty of a disc but also makes the optical and electrical characteristics thereof unstable. That is, for example, there arise wobbles in recording/reproducing signals.

OBJECT AND SUMMARY OF THE INVENTION

It is therefore an object of the present invention to overcome the above-mentioned drawbacks by providing a molding die apparatus which can release the whole main surface of a molded disc substrate uniformly from a molding surface at the time of opening the molding die apparatus so as to prevent the molded disc substrate from generating a separation pattern at the time of separating the molded disc substrate from the molding die apparatus, a method for molding a disc substrate using the molding die apparatus, and a disc-shaped recording medium having a disc substrate molded by the molding die apparatus.

According to the present invention, there is provided a molding die apparatus including:

a pair of stationary die and movable die for molding a disc substrate of a disc-shaped recording medium; and an outer circumference ring for molding an outer circumference end of the disc substrate;

the outer circumference ring being so mounted as to be movable along forward and backward directions in parallel with a moving direction of the movable die toward the stationary die, and having a retaining surface for retaining the outer circumference of the molded disc substrate.

According to the molding die apparatus of the present invention, since the molded disc substrate has its outer circumference retained by the retaining surface of the outer circumference ring, when the outer circumference ring is moved along forward and backward directions, the molded disc substrate is moved together with the outer circumference ring.

Thus, according to the molding die apparatus of the present invention, the disc substrate can be prevented from generating a separation pattern on the main surface thereof.

According to the present invention, there is provided a method for molding a disc substrate by injection molding by the use of a pair of stationary die and movable die for molding a disc substrate of a disc-shaped recording medium, and an outer circumference ring for molding an outer circumference end of the disc substrate which is so mounted as to be movable along forward and backward directions in parallel with a moving direction of the movable die toward the stationary die, the method for molding a disc substrate including the steps of:

moving the outer circumference ring along backward direction away from the stationary die to cause the outer circumference ring to protrude by a protrusion length which is approximately equal to the thickness of the disc substrate so as to perform injection molding at the time of die clamping;

moving the outer circumference ring along forward direction toward the stationary die to cause the outer circumference ring to protrude so as to separate a main surface of the disc substrate by a predetermined amount from a molding surface of the movable die for molding the main surface of the disc substrate by the use of a retaining surface for retaining the outer circumference of the molded disc substrate which is formed at the inner circumference of the outer circumference ring when die opening is initiated; and ejecting the disc substrate from the molding surface of the movable die after the die opening is finished.

According to the method for molding a disc substrate of the present invention, since the molded disc substrate has its outer circumference retained by the retaining surface of the outer circumference ring, the molded disc substrate is moved together with the outer circumference ring and the main surface of the disc substrate is separated from the molding surface of the movable die by moving the outer circumference ring to cause it to protrude toward the stationary die when die opening is initiated. Then, the molded disc substrate is ejected from the molding surface of the movable die after the die opening is finished.

Thus, according to the method for molding a disc substrate of the present invention, the disc substrate can be prevented from generating a separation pattern on the main surface thereof.

According to the present invention, there is provided a disc-shaped recording medium which has a retaining surface being of a continuous or discontinuous ring-shaped surface around the outer circumference thereof which is formed by an outer circumference ring of a molding die apparatus for molding an outer circumference end of a disc substrate, and is retained by the outer circumference ring.

According to the disc-shaped recording medium of the present invention, since the molded disc substrate has its outer circumference retained by the retaining surface of the outer circumference ring, the molded disc substrate has its main surface satisfactorily separated from the movable die.

Thus, according to the disc-shaped recording medium of the present invention, being prevented from generating a separation pattern on the main surface thereof, the optical and electrical characteristics of the disc substrate can remain stable and desirably secured.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The molding die apparatus according to the present invention for molding a disc substrate of a magneto-optical disc by injection molding will further be described below with reference to the accompanying drawings.

The molding die apparatus according to the present invention will be employed in molding a disc substrate having a diameter of 130 mm to be used as a basal plate of a magneto-optical disc conforming, for example, to the ISO/IEC1528 standard. The magneto-optical disc has a recording capacity of 5.2 GB (giga byte).

Figure 1:
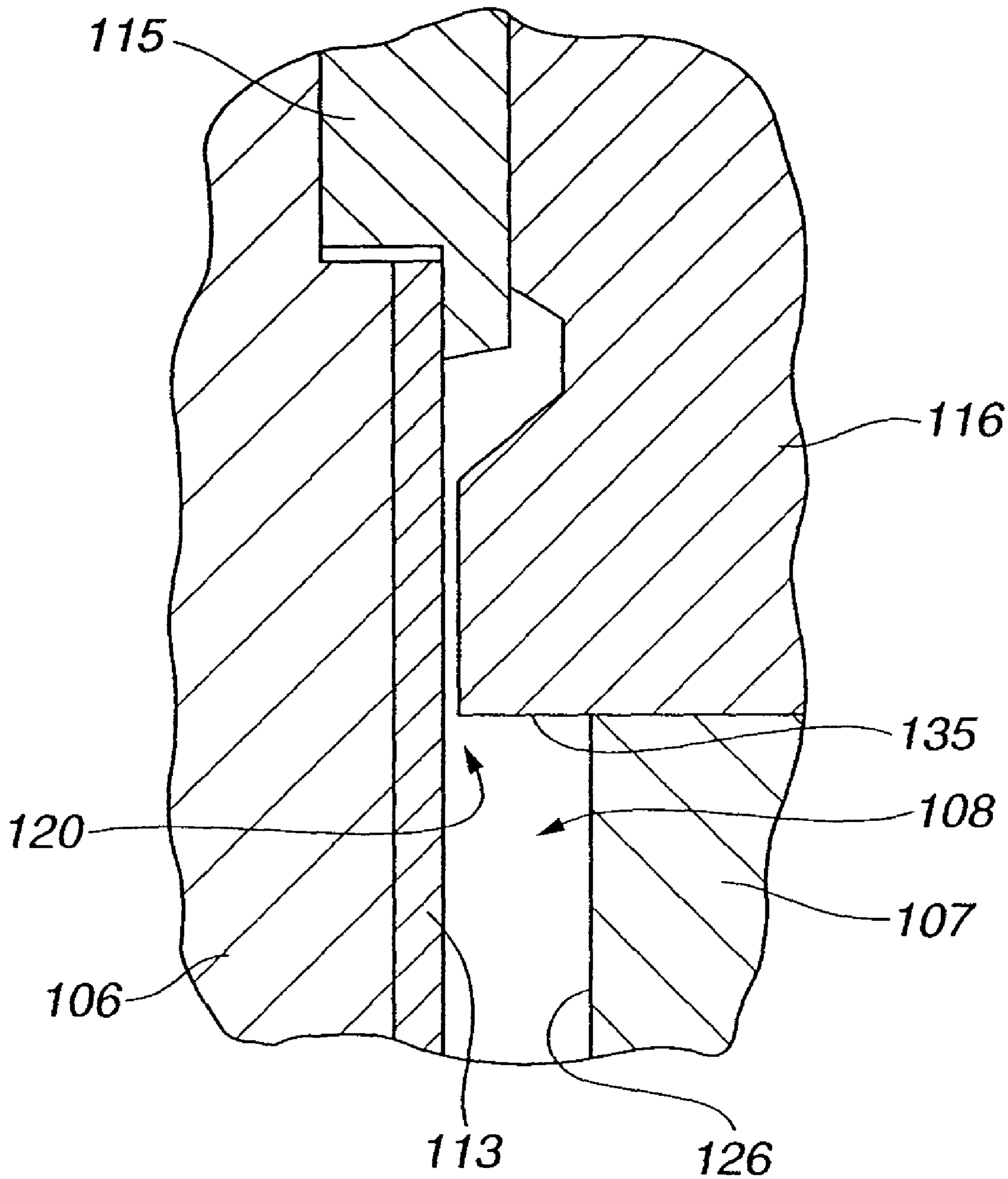
FIG. 1 shows a longitudinal sectional view for explaining an outer circumference ring of the conventional molding die.
Figure 2:
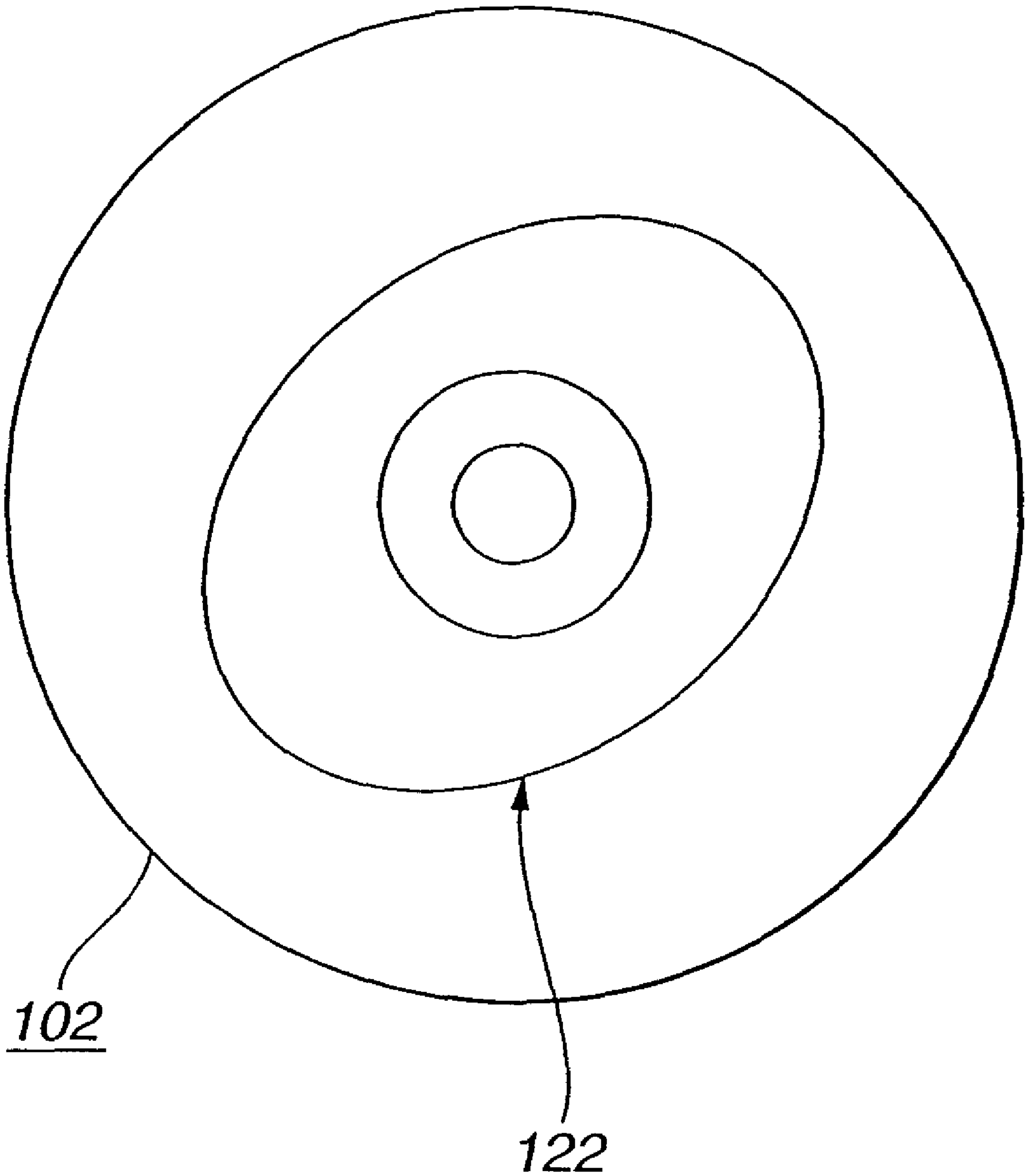
FIG. 2 shows a plan view of a separation pattern generated on the main surface of a disc substrate molded by the conventional molding die.
Figure 3:
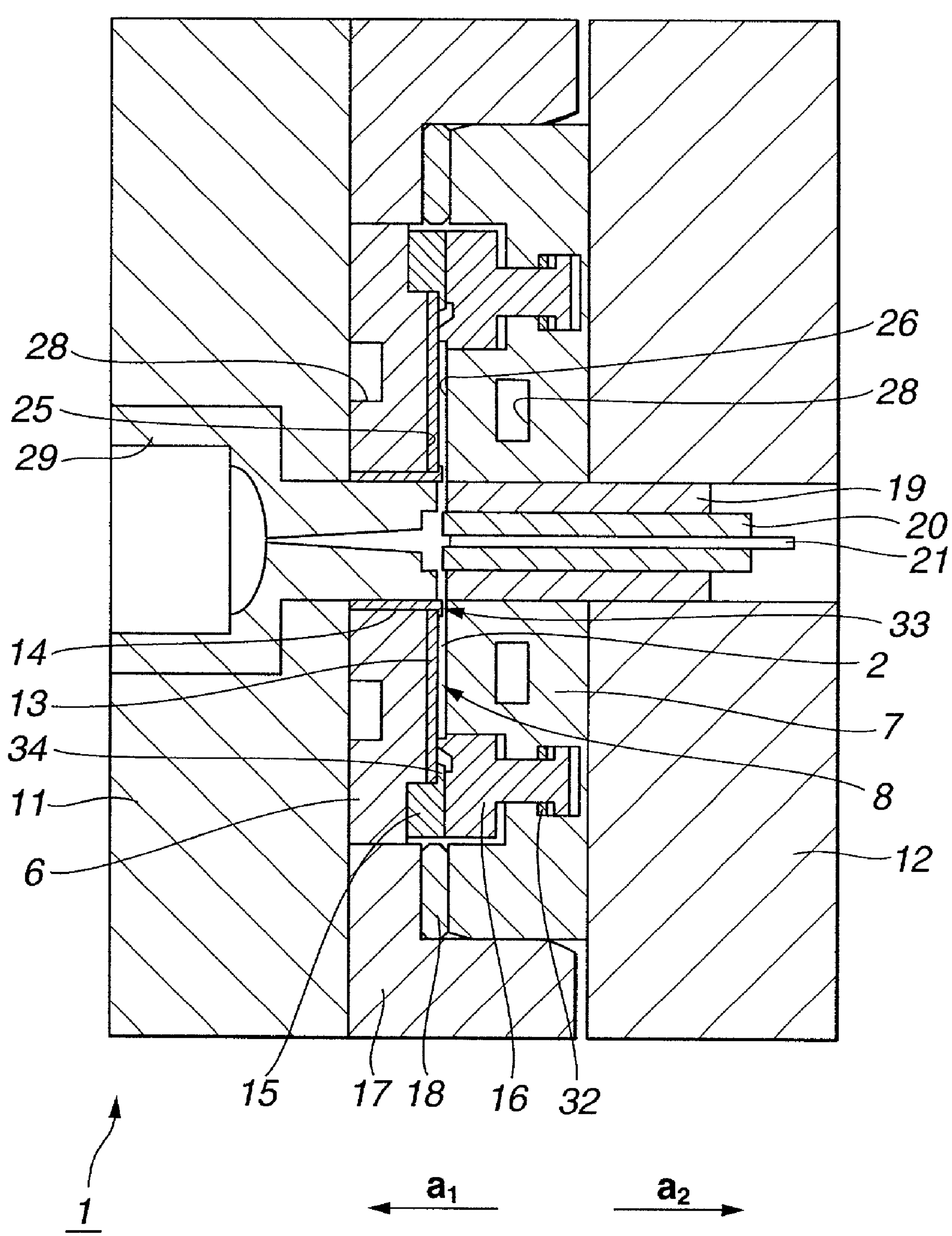
FIG. 3 shows a longitudinal sectional view for explaining the whole configuration of the molding die according to the present invention.

A molding die 1 according to the present invention includes a pair of stationary die 6 and movable die 7 which configure a cavity 8 for molding a disc substrate 2, a stationary die holder 11 for holding the stationary die 6, a movable die holder 12 for holding the movable die 7, a stamper 13 for transcribing predetermined convexo-concave patterns onto the disc substrate 2, an inner stamper holder 14 for fixing the inner circumference of the stamper 13 to the stationary die 6, an outer stamper holder 15 for fixing the outer circumference of the stamper 13 to the stationary die 6, and an outer circumference ring 16 for molding an outer circumference end of the disc substrate 2, as shown in FIG. 3.

Furthermore, the molding die 1 includes a frame 17 for guiding the movable die 7 toward the stationary die 6, a spacer 18 for adjusting the size of the cavity 8, a sleeve 19 for ejecting the disc substrate 2, a punch 20 for cutting off a gate around a center hole of the disc substrate 2, and a pin 21 for ejecting the center hole portion cut off by the punch 20 and a spool runner, as shown in FIG. 3.

There is formed a stationary side mirror-finished surface 25 at the stationary die 6 on which the stamper 13 is to be mounted, as shown in FIG. 3. The movable die 7 is so mounted as to face the stationary die 6 and be movable toward the stationary die 6 along forward and backward directions shown by arrows $a_1$ and $a_2$ in FIG. 3. On the other hand, there is formed a movable side mirror-finished surface 26 (referred to as a molding surface 26, hereinafter) at the movable die, which molds a main surface of the disc substrate 2. And, there is formed a temperature adjustment water channel 28 which causes chilled water for cooling down the cavity 8 to flow at each of the stationary die 6 and movable die 7.

There is formed a spool bush 29 into which molten resin material injected by a screw of an injection molding apparatus, not shown, flows. As the resin material, polycarbonate, PMMA (polymethylmethacrylate), etc is used. The sleeve 19 is movably mounted to the center of the movable die holder 12 and movable die 7.

The stamper 13 is of a disc-shaped configuration having a center hole, and has predetermined convexo-concave patterns such as pre-grooves and preformatted pits formed on a main surface thereof which face the cavity 8. The stamper 13 is abutted to the stationary side mirror-finished surface 25 of the stationary die 6, and has its inner circumference pressed by the inner stamper holder 14 and its outer circumference pressed by the outer stamper holder 15, respectively, toward the stationary side mirror-finished surface 25 and fixed.

The inner stamper holder 14 is substantially of a cylindrical configuration, and has a pawl 33 for retaining the inner circumference of the stamper 13 at the outer circumference thereof. The outer stamper holder 15 is substantially of a cylindrical configuration, and has a pawl 34 for retaining the outer circumference of the stamper 13 at the inner circumference thereof.

Figure 4:
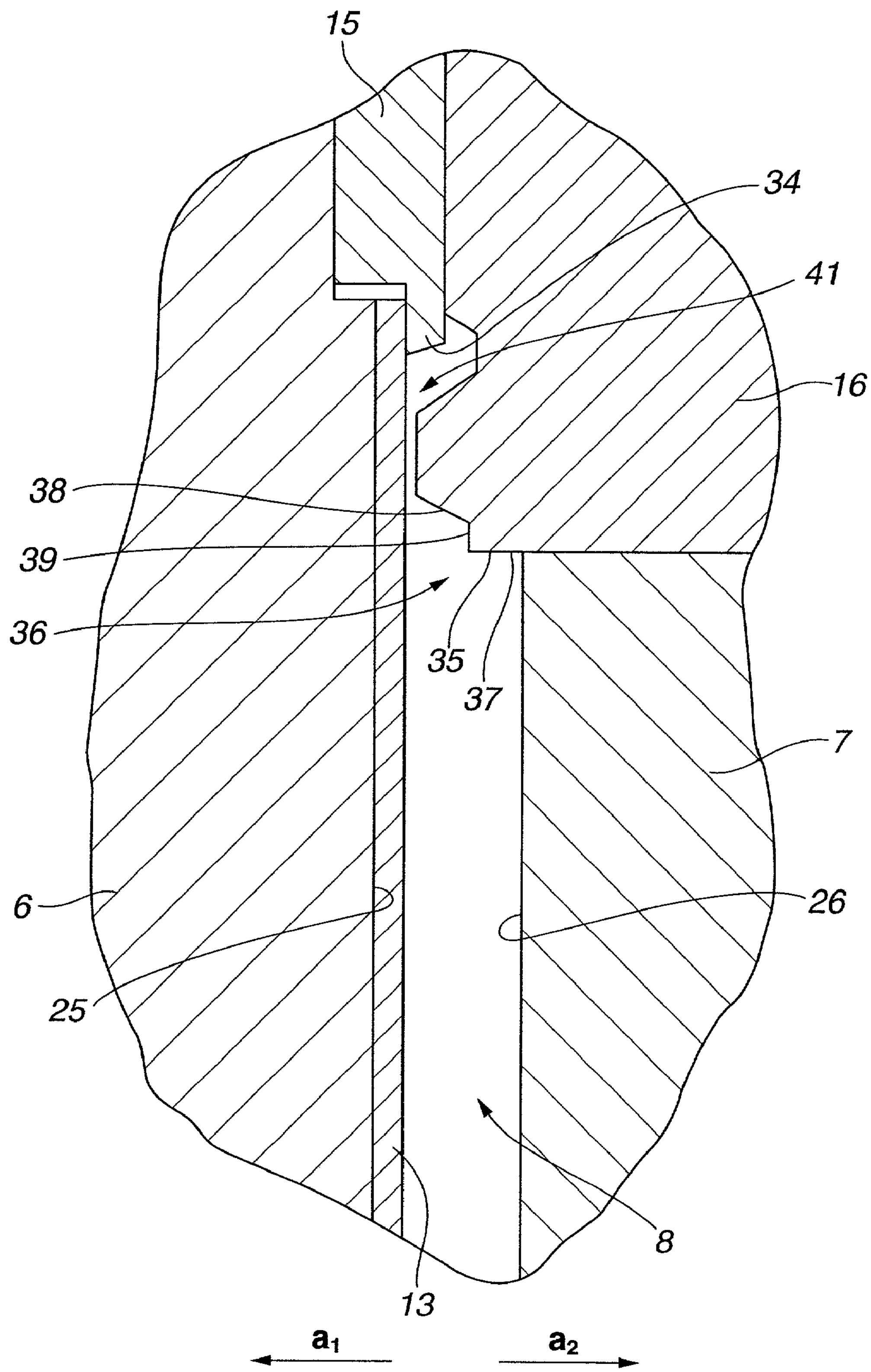
FIG. 4 shows a longitudinal sectional view for explaining the principal portion of the molding die according to the present invention.

The outer circumference ring 16 is substantially of a ring-shaped configuration, and is located at outside the outer circumference of the molding surface 26 of the movable die 7, as shown in FIGS. 3 and 4. The outer circumference ring 16 is so mounted to the movable die 7 as to be movable toward the stationary die 6 along the forward and backward directions shown by arrows $a_1$ and $a_2$. The outer circumference ring 16 has its one end movably supported by the movable die 7 via a substantially ring-shaped spacer 32 for adjusting the movement of the outer circumference ring 16 along the forward direction shown by the arrow $a_1$.

Figure 5:
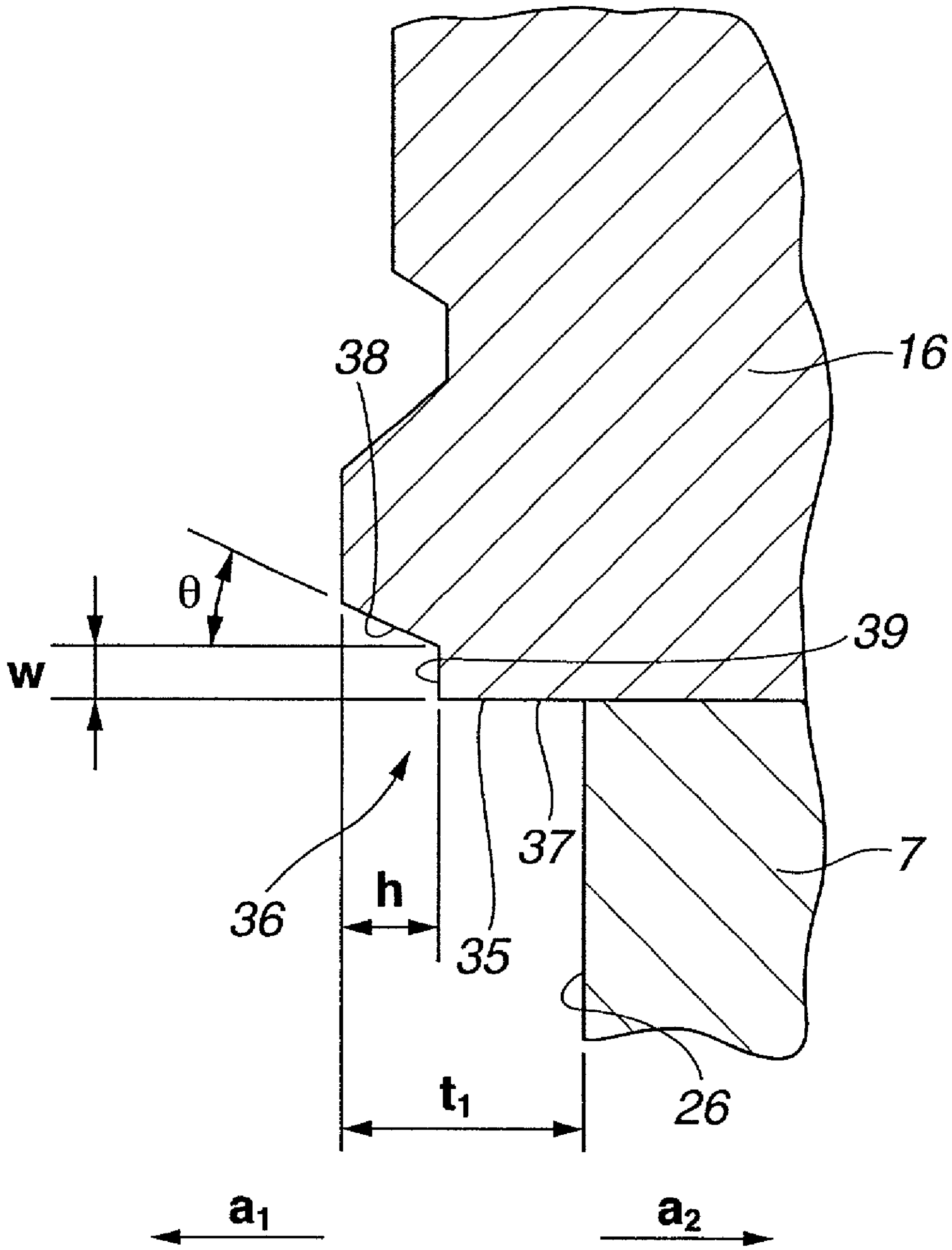
FIG. 5 shows a longitudinal sectional view for explaining an outer circumference ring of the molding die according to the present invention.

There is formed a molding surface 35 for molding the outer circumference end of the disc substrate 2 on the inner circumference of a portion of the outer circumference ring 16 which is adjacent to the stamper 13, as shown in FIGS. 4 and 5. Thus, the molding die 1 has the cavity 8 enclosed by a main surface of the stamper 13 abutted to the stationary die 6, the molding surface 26 of the movable die 7, and molding surface 35 of the outer circumference ring 16. The cavity 8 has its size appropriately adjusted when the thickness of the spacer 18 is controlled.

There is formed a retaining portion 36 for retaining the outer circumference of the disc substrate 2, which is located halfway at the molding surface 35 along the thickness direction of the molded disc substrate 2.

The retaining portion 36 is of a step-shaped configuration along the thickness direction of the disc substrate 2. The retaining portion 36 has a vertical surface 37 perpendicular to the main surface of the disc substrate 2, an inclined surface 38 which is so formed as to be inclined along the thickness direction of the disc substrate 2, and a retaining surface 39 formed in parallel with the main surface of the disc substrate 2 between the vertical surface 37 and the inclined surface 38, as shown in FIG. 5. The vertical surface 37 is so formed as to be adjacent to the molding surface 26 of the movable die 7.

The inclined surface 38 is so formed as to face the stamper 13 and make the diameter of the molded disc substrate 2 gradually increased when getting closer the stamper 13. The inclined surface 38 of the outer circumference ring 16 can allow the disc substrate 2 to be separated from the molding surface 26 of the movable die 7 with smaller separation resistance, which can prevent deformation of the disc substrate 2.

The retaining surface 39 is of a continuous ring-shaped surface around the outer circumference of the disc substrate 2. The retaining surface 39 may be of a discontinuous ring-shaped surface around the outer circumference of the disc substrate 2.

In case the disc substrate 2 having a diameter of 130 mm is to be molded, the inclined surface 38 is formed such that the height h along the thickness direction of the disc substrate 2 from the retaining surface 39 to an end of the portion of the outer circumference ring 16 adjacent to the stamper 13 becomes approximately 1 mm and the angle of inclination θ from the thickness direction of the disc substrate 2 becomes approximately 5 degrees, as shown in FIG. 5. In this case, the retaining surface 39 is formed such that the width w along a direction perpendicular to the thickness direction of the disc substrate 2 from the beginning of the inclined surface 38 to the vertical surface 37 becomes approximately 0.3 mm. And, the cavity 8 is adjusted by the spacer 18 such that the interval between the molding surface 26 of the movable die 7 and the main surface of the stamper 13 becomes a little less than 1.2 mm.

At the time of opening the molding die 1, the outer circumference ring 16 can be moved along the forward direction shown by the arrow $a_1$ by a moving means, not shown, using air pressure, etc. such that the molding surface 35 protrudes from the molding surface 26 of the movable die 7 by the maximum protrusion length $t_1$ which is lager than the thickness of the disc substrate 2, as shown in FIG. 5. On the other hand, at the time of clamping the molding die 1, since the outer circumference of the outer circumference ring 16 is abutted to the outer stamper holder 15, the outer circumference ring 16 is pressed and moved toward the movable die 7 along the backward direction shown by the arrow $a_2$such that the molding surface 35 protrudes from the molding surface 26 of the movable die 7 by a predetermined protrusion length $t_0$ which is approximately equal to the thickness of the disc substrate 2, as shown in FIG. 6.

In case the disc substrate 2 having a thickness of 1.2 mm is to be molded, the outer circumference ring 16 has its maximum protrusion length $t_1$ set to be 1.4 mm to 1.7 mm. Thus, the outer circumference ring 16 protrudes by the predetermined protrusion length $t_0$ of 1.2 mm which is approximately equal to the thickness of the disc substrate 2 when the molding die 1 is clamped, and is moved along the forward direction shown by the arrow $a_1$ by 0.2 mm to 0.5 mm at the time of opening the molding die 1.

Figure 6:
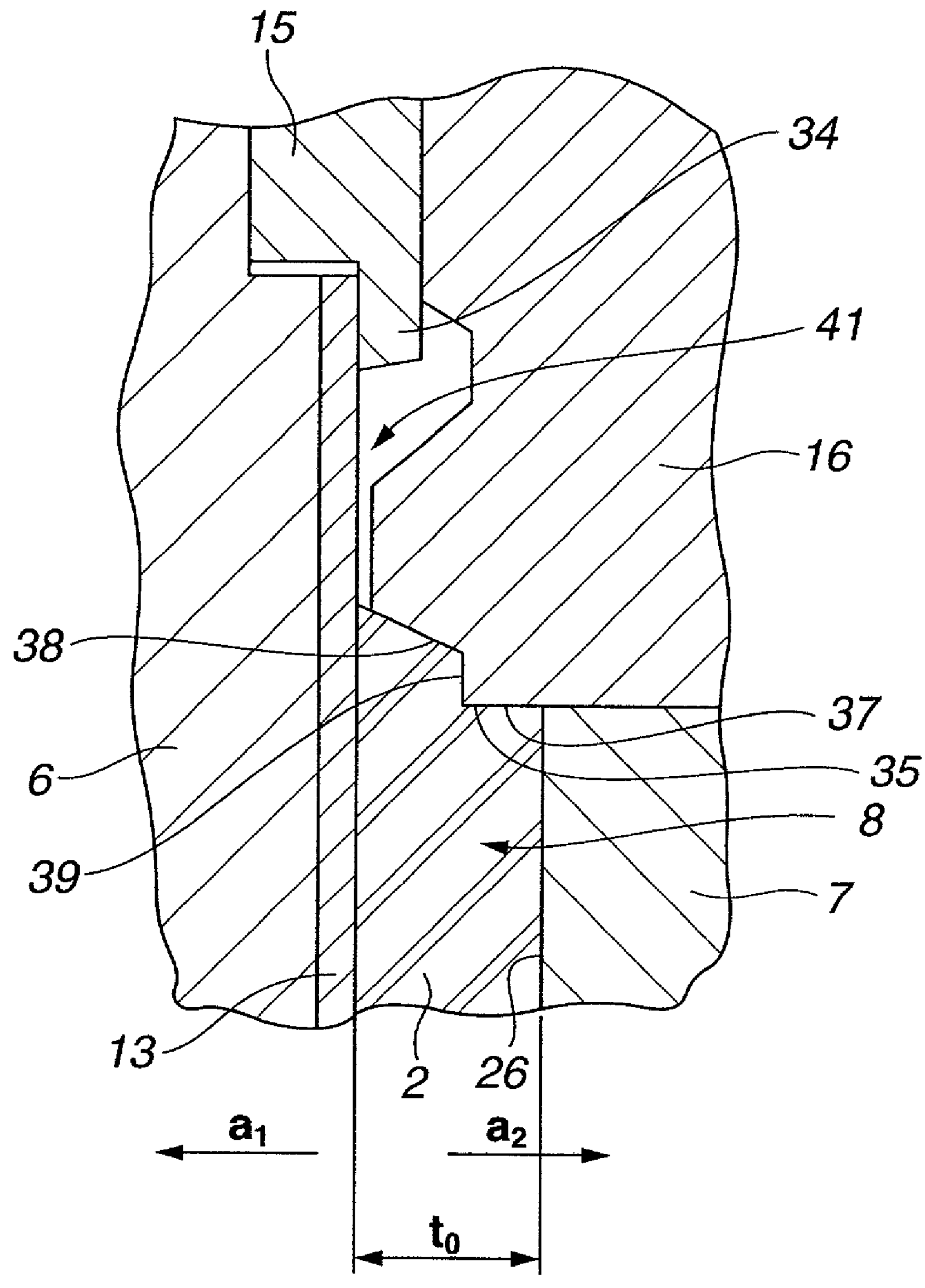
FIG. 6 shows a longitudinal sectional view for explaining a state in which the molding die according to the present invention is clamped.

The outer circumference ring 16 is configured such that, at the time of clamping the molding die 1, there is secured a clearance gap 41 for evacuating gas in the cavity 8 between the end of the portion of the outer circumference ring 16 which faces the main surface of the stamper 13 and the main surface of the stamper 13, as shown in FIG. 6.

The clearance gap 41, which is generally set to be 5 $\mu$m to 40 $\mu$m, is set to be approximately 20 $\mu$m by the outer circumference ring 16. So, molten resin material is surely prevented from flowing into the clearance gap 41, which suppresses generation of burrs around the outer circumference of the molded disc substrate 2.

Figure 8:
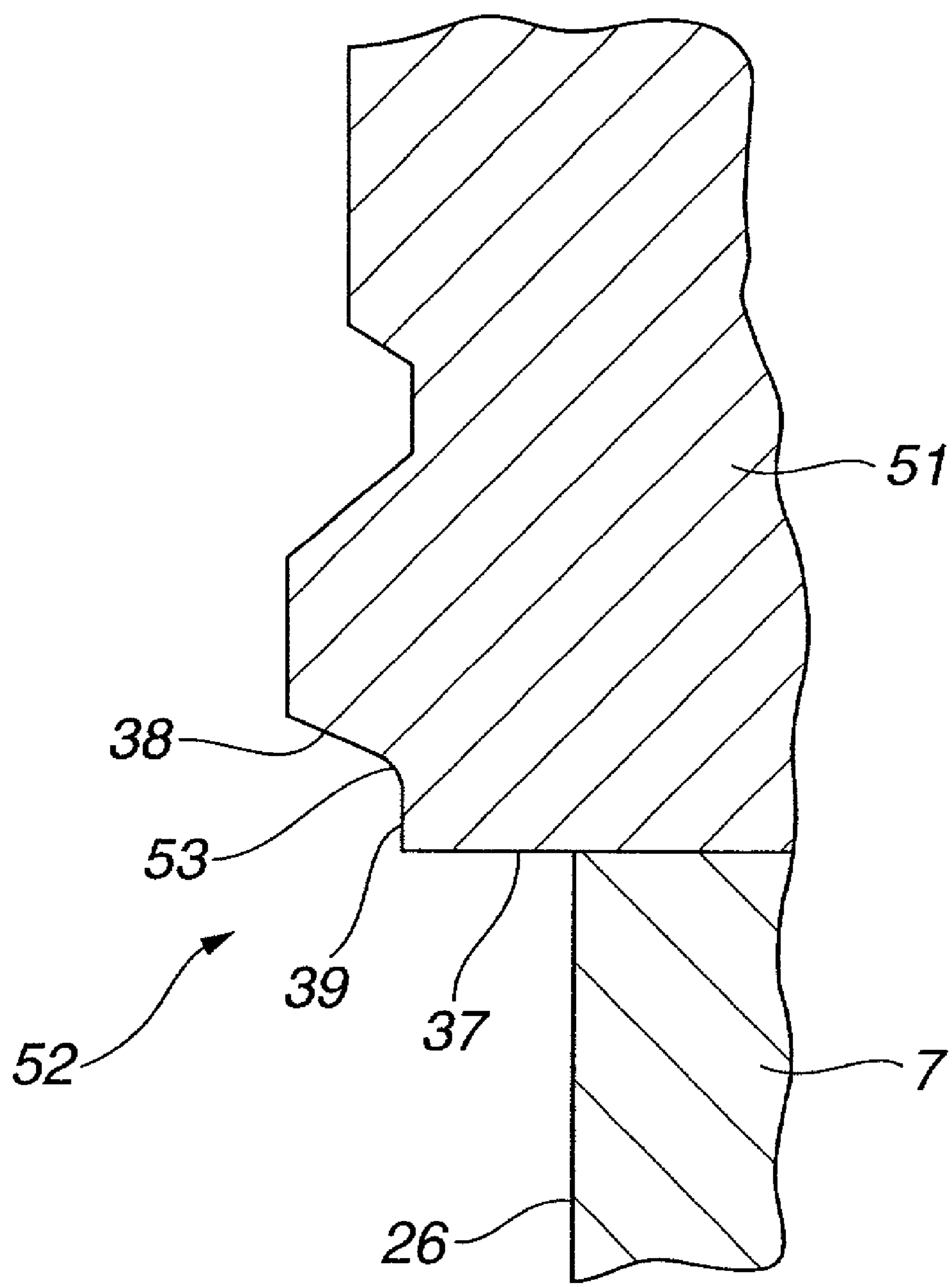
FIG. 8 shows a longitudinal sectional view for explaining another outer circumference ring of the molding die according to the present invention.

As has been described above, the molding surface 35 of the outer circumference ring 16 is formed such that the inclined surface 38 and retaining surface 39 form an obtuse angle. On the other hand, the molding surface 35 of the outer circumference ring 16 may be formed such that the inclined surface 38 and retaining surface 39 form a curved surface without forming an angle, as shown in FIG. 8.

As has also been described above, the outer circumference ring 16 has the inclined surface 38 on its one end adjacent to the stamper 13. On the other hand, the outer circumference ring 16 may have a vertical surface perpendicular to the main surface of the disc substrate 2 on its one end adjacent to the stamper 13.

Figure 9:
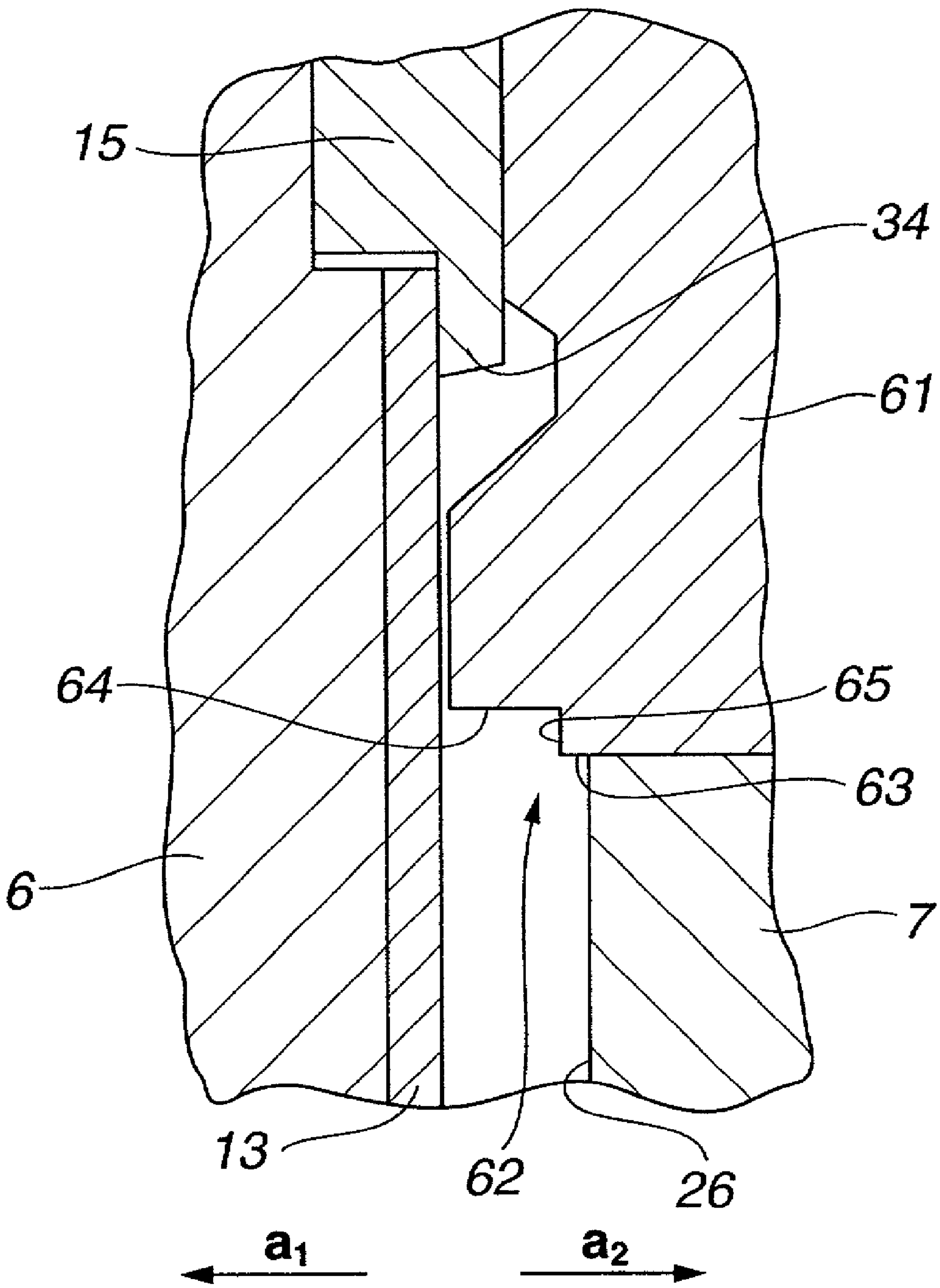
FIG. 9 shows a longitudinal sectional view for explaining yet another outer circumference ring of the molding die according to the present invention.

FIG. 9 shows another example of an outer circumference ring, which will be indicated with a reference numeral of 61. As shown, there is also formed a retaining portion 62 for retaining the outer circumference of the disc substrate 2.

The retaining portion 62 is of a step-shaped configuration along the thickness direction of the disc substrate 2. The retaining portion 62 has a first vertical surface 63 perpendicular to the main surface of the disc substrate 2, a second vertical surface 64 perpendicular to the main surface of the disc substrate 2, and a retaining surface 65 formed in parallel with the main surface of the disc substrate 2 between the first vertical surface 63 and the second vertical surface 64, as shown in FIG. 9. The first vertical surface 63 is so formed as to be adjacent to the molding surface 26 of the movable die 7. The second vertical surface 64 is so formed as to be adjacent to the main surface of the stamper 13, and is located at the outer circumference of the first vertical surface 63.

Since the outer circumference ring 61 has the second vertical surface 64 with no inclination, separation resistance caused at the time of ejecting the disc substrate 2 from the molding surface 26 of the movable die 7 becomes undesirably large compared with the case in which above-described outer circumference ring 16 having the inclined surface 38 is used. So, it is desired that the outer circumference ring has an inclined surface like the outer circumference ring 16 having the inclined surface 38.

The configuration of forming an inclined surface at an outer circumference ring is disclosed in, for example, Japanese Laying-Open Patent H-3-283114. However, the outer circumference ring disclosed in the Japanese Laying-Open Patent H-3-283114 has only the inclined surface at its retaining portion. So, since the outer circumference of the disc substrate cannot be retained sufficiently, a pressure for ejecting the disc substrate cannot be transmitted to the disc substrate appropriately.

Next, parts for forming a center hole of the disc substrate 2 will be explained. The sleeve 19 is substantially of a cylindrical configuration, and has its one end caused to face the inner circumference of the disc substrate 2, as shown in FIG. 3. The sleeve 19 is so mounted as to be movable along the forward and backward directions shown by arrows $a_1$ and $a_2$. The punch 20 is substantially of a cylindrical configuration, and has its one end caused to face the cavity 8. The punch 20 is mounted inside the inner circumference of the sleeve 19, and is so mounted as to be movable along the forward and backward directions shown by arrows $a_1$ and $a_2$. The pin 21 is substantially of a rod configuration. The punch 20 is mounted inside the inner circumference of the punch 20, and is so mounted as to be movable along the forward and backward directions shown by arrows $a_1$ and $a_2$.

Next, the movement of the outer circumference ring 16 at the time of clamping and opening the molding die 1, and the method for molding the disc substrate 2 will be explained.

At the time of opening the molding die 1, the molding surface 35 of the outer circumference ring 16 is moved along the forward direction shown by the arrow $a_1$, such that the molding surface 35 protrudes from the molding surface 26 of the movable die 7 by the maximum protrusion length $t_1$ which is lager than the thickness of the disc substrate 2, as shown in FIG. 5.

Then, the molding die 1 is clamped when the movable die 7 is moved toward the stationary die 6 along the forward direction shown by the arrow $a_1$. At the time of clamping the molding die 1, since the outer circumference of the outer circumference ring 16 is abutted to the outer stamper holder 15, the outer circumference ring 16 is pressed and moved toward the movable die 7 along the backward direction $a_2$, as shown in FIG. 6. And, the molding surface 35 of the outer circumference ring 16 is moved along the backward direction shown by the arrow $a_2$ such that the molding surface 35 protrudes from the molding surface 26 of the movable die 7 by the predetermined protrusion length $t_0$ which is approximately equal to the thickness of the disc substrate 2.

When the molding die 1 is clamped, an injection molding apparatus, not shown, injects molten resin material thorough the spool bush 29 into the cavity 8 enclosed by the molding surface 35 of the outer circumference ring 16 which protrudes from the molding surface 26 of the movable die 7 by the predetermined protrusion length $t_0$, main surface of the stamper 13, and molding surface 26 of the movable die 7. After the injection of molten resin material into the cavity 8 is completed, the punch 20 is moved along the forward direction shown by the arrow $a_1$ to cut off a gate around a center hole of the disc substrate 2. After cooling down the molten resin material, the molding die 1 is opened.

Figure 7:
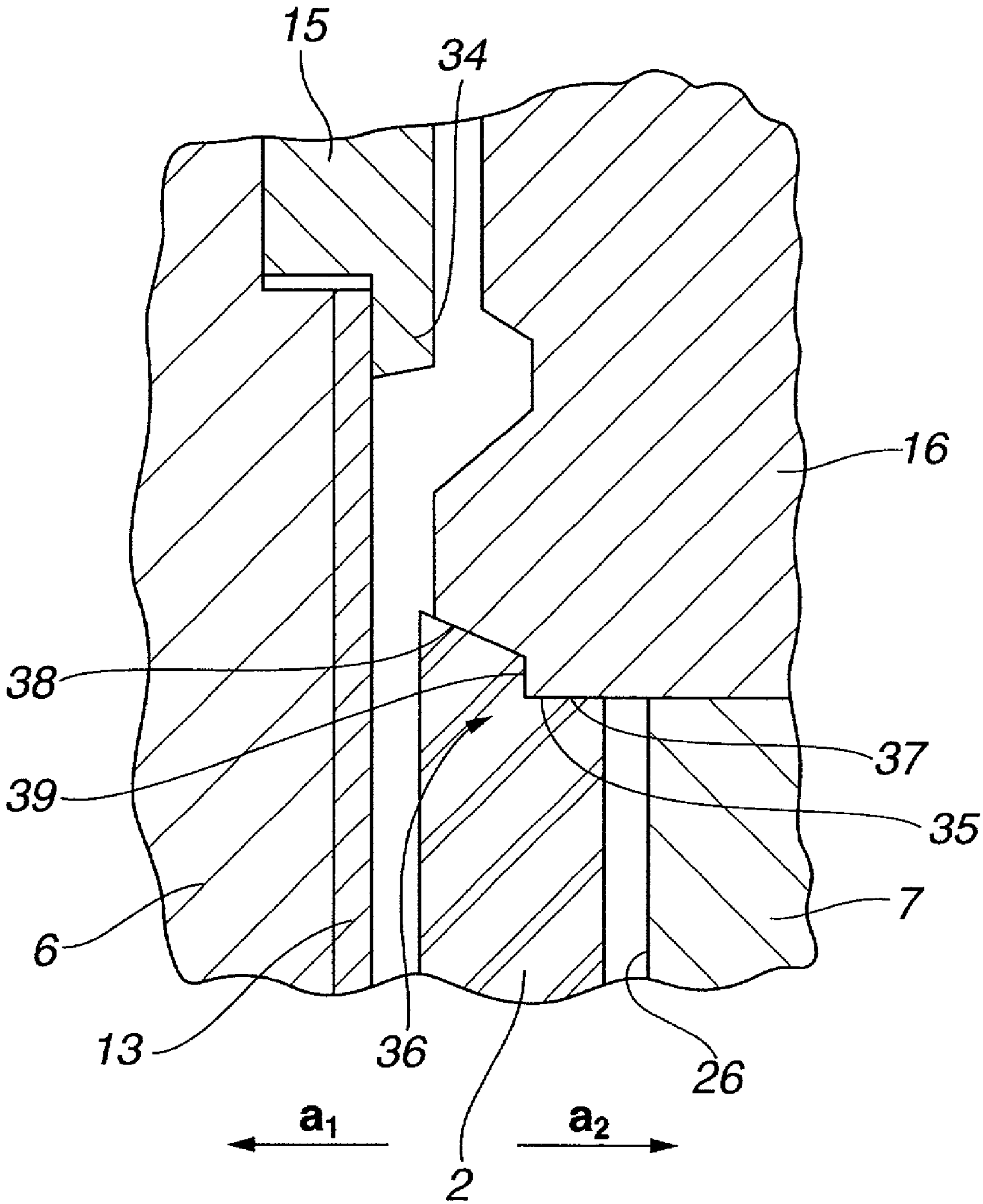
FIG. 7 shows a longitudinal sectional view for explaining a state in which the molding die according to the present invention is opened.

When the molding die 1 is opened, the movable die 7 is moved away from the stationary die 6 along the backward direction shown by the arrow $a_2$, and the molding surface 35 protrudes from the molding surface 26 of the movable die 7 by the maximum protrusion length $t_1$, as show in FIG. 7. When the molding die 1 is opened, the disc substrate 2 is moved together with the movable die 7 away from the stationary die 6 along the backward direction shown by the arrow $a_2$.

Then, since the outer circumference of the disc substrate 2 is retained by the retaining portion 36 of the outer circumference ring 16, the molding surface 35 of the outer circumference ring 16 which protrudes by the maximum protrusion length $t_1$ moves the outer circumference of the disc substrate 2 along the forward direction shown by the arrow $a_1$, as shown in FIG. 7. Thus, the main surface of the disc substrate 2 is satisfactorily separated from the molding surface 26 of the movable die 7.

Then the molding die 1 has the pin 21 and sleeve 19 moved along the forward direction shown by the arrow $a_1$ to eject the disc substrate 2 from the movable die 7. Thus ejected disc substrate 2 is held and taken out by a holding means, not shown, having a sucking means for sucking the disc substrate 2, and is carried to the next processing step.

The disc substrate 2 thus molded by the molding die 1 is inspected using a polarizing plate, etc. The result is that there is generated no separation pattern between the outer circumference and the inner circumference of the disc substrate 2. So, the molded disc substrate 2 can be prevented from generating a separation pattern when the molded disc substrate 2 is separated from the molding die 1. Thus, the optical and electrical characteristics of a magneto-optical disc using the disc substrate 2 can remain stable and desirably secured.

As has been described above, the molding die 1 includes the outer circumference ring 16 which has formed thereon the retaining surface 39 for retaining the outer circumference of the disc substrate 2. So, when the outer circumference ring 16 is moved along the forward direction shown by the arrow $a_1$, the outer circumference ring 16 can release the whole main surface of the disc substrate 2 uniformly from the molding surface 26 of the movable die 7 and appropriately separate the disc substrate 2. So, the disc substrate 2 can be prevented from generating a separation pattern on the main surface thereof.

Above-described outer circumference rings 16, 51, 61 have formed thereon retaining portions 36, 62 located halfway at the molding surface 35 along the thickness direction of the molded disc substrate 2 which have retaining surfaces 39, 65. On the other hand, the retaining surface may be so formed as to be at approximately the same level as the molding surface 26 of the movable die 7, and another example of an outer circumference ring having such a retaining surface will be explained hereinafter.

Figure 10:
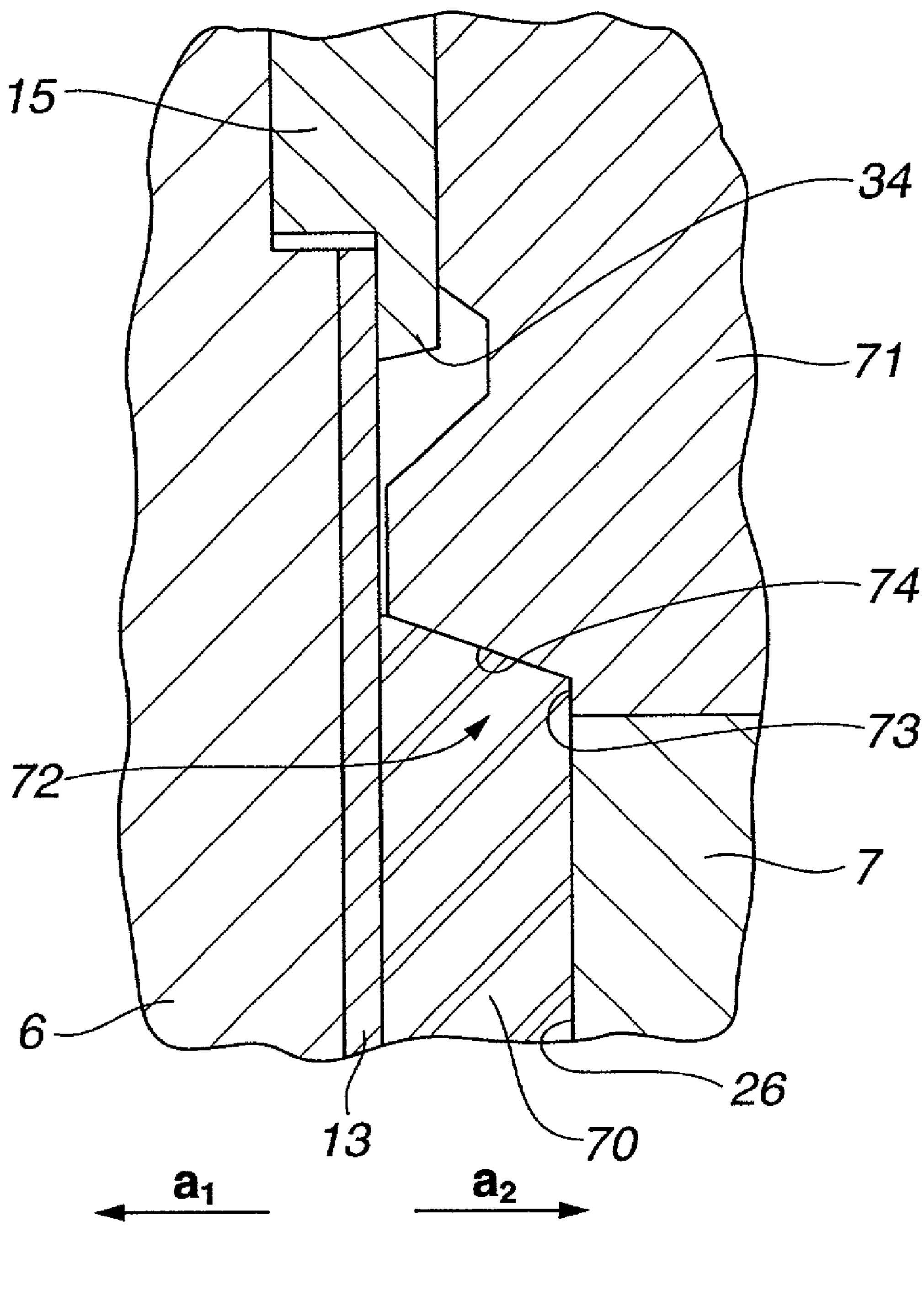
FIG. 10 shows a longitudinal sectional view for explaining a state in which the molding die according to the present invention using yet another outer circumference ring is clamped.
Figure 11:
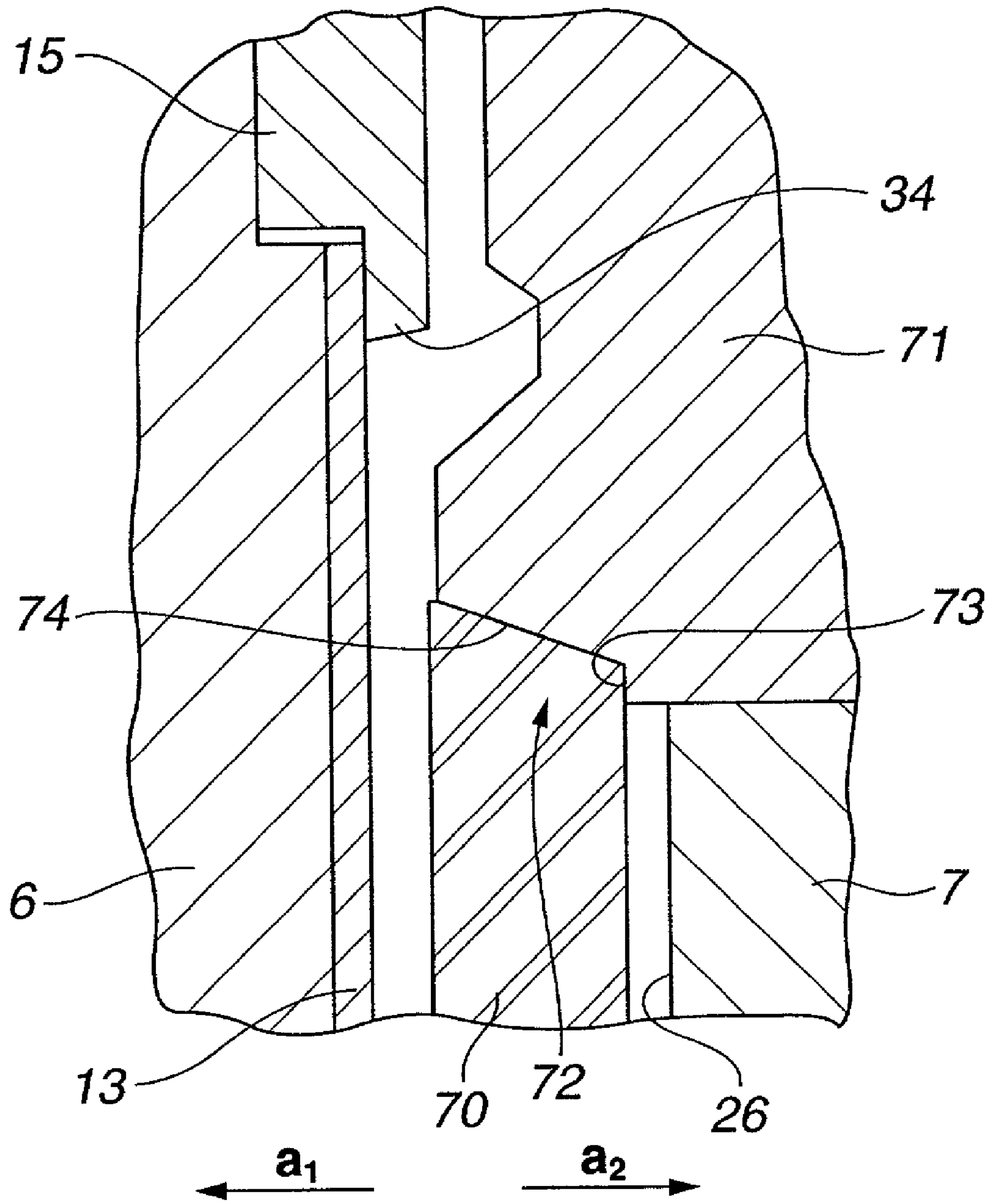
FIG. 11 shows a longitudinal sectional view for explaining a state in which the molding die according to the present invention using yet another outer circumference ring is opened.

FIGS. 10 and 11 show another example of an outer circumference ring, which will be indicated with a reference numeral of 71. As shown, there is also formed a molding surface 72 for molding an outer circumference end of a disc substrate 70. The molding surface 72 has a retaining surface 73 which is formed at the same level as the molding surface 26 of the movable die 7, and an inclined surface 74 so formed as to be inclined along the thickness direction of the disc substrate 70, as shown in FIG. 10. The inclined surface 74 is so formed as to face the stamper 13 and make the diameter of the molded disc substrate 70 gradually increased when getting closer the stamper 13.

The retaining surface 73 retains the outer circumference of the disc substrate 70. So, as shown FIG. 11, when the outer circumference ring 71 is moved along the forward direction shown by the arrow $a_1$, the outer circumference ring 71 can release the whole main surface of the disc substrate 70 uniformly from the molding surface 26 of the movable die 7, and appropriately separate the disc substrate 70. So, the disc substrate 70 can be prevented from generating a separation pattern on the main surface thereof.

As in the above, the molding die apparatus and method for molding a disc substrate according to the present invention is employed in molding a disc substrate of a magneto-optical disc as a disc-shaped recording medium by injection molding. On the other hand, the molding die apparatus and method for molding a disc substrate according to the present invention can also be employed in molding a disc substrate of other types of disc-shaped recording medium such as a CD (Compact Disc), CD-R (Recordable), CD-RW (ReWritable), and DVD (Digital Versatile Disc).

What is claimed is:

1. A disc molding apparatus comprising:

a stationary die, a movable die, including a molding surface and an outer circumferential ring for together molding a disc-shaped recording medium;

the stationary die having a molding surface for forming the surface of the disc opposite the moveable die; and the outer circumference ring being for molding the outer circumference of the disc;

the outer circumference ring being movable along forward and backward directions in parallel with a direction of movement of the movable die relative to the stationary die;

characterized in that the outer circumference ring has a retaining surface, when a disc is molded, parallel to the said molding surface of the movable die for forming an outer circumferential surface of the disc parallel to and at the same level as the said molding surface, which outer circumference surface is a continuous or discontinuous ring and an edge surface extending at a single angle transversely from the retaining surface to the surface of stationary die to form the transverse edge of the molded disc from the retaining surface to the surface of the stationary die.

2. Apparatus according to claim 1, wherein the said retaining surface is, when a disc is molded, parallel to said molding surface and the surface for forming the surface of the disc opposite the molding surface.

3. Apparatus according to claim 1, wherein the edge surface is inclined at obtuse angle to the retaining surface.

4. Apparatus according to claim 1, wherein the edge surface is inclined at obtuse angle to the retaining surface.

5. Apparatus according to claim 2, wherein the edge surface is inclined at obtuse angle to the retaining surface.

6. Apparatus according to claim 1, wherein the edge surface is perpendicular to the retaining surface.

7. The apparatus as set forth in claim 1 comprising:

the outer circumference ring being mounted to the movable die and being movable by the moving means at the time of the die opening, along the forward direction toward the stationary die as to protrude from the movable die by a first protrusion length, relative to the molding surface, which is larger than the thickness of the disc substrate and being abutted to the stationary die and movable by the moving means at the time of die clamping in the backward direction away from the stationary die as to protrude from the movable die by a second protrusion length relative to the molding surface, approximately equal to the thickness of the disc substrate at the time of die clamping.

8. The apparatus as set forth in claim 2 comprising:

the outer circumference ring being mounted to the movable die and being movable by the moving means at the time of the die opening, along the forward direction toward the stationary die as to protrude from the movable die by a first protrusion length, relative to the molding surface, which is larger than the thickness of the disc substrate and being abutted to the stationary die and movable by the moving means at the time of die clamping in the backward direction away from the stationary die as to protrude from the movable die by a second protrusion length relative to the molding surface, approximately equal to the thickness of the disc substrate at the time of die clamping.

9. The apparatus as set forth in claim 3 comprising:

the outer circumference ring being mounted to the movable die and being movable by the moving means at the time of the die opening, along the forward direction toward the stationary die as to protrude from the movable die by a first protrusion length, relative to the molding surface, which is larger than the thickness of the disc substrate and being abutted to the stationary die and movable by the moving means at the time of die clamping in the backward direction away from the stationary die as to protrude from the movable die by a second protrusion length relative to the molding surface, approximately equal to the thickness of the disc substrate at the time of die clamping.

10. The apparatus as set forth in claim 6 comprising:

the outer circumference ring being mounted to the movable die and being movable by the moving means at the time of the die opening, along the forward direction toward the stationary die as to protrude from the movable die by a first protrusion length, relative to the molding surface, which is larger than the thickness of the disc substrate and being abutted to the stationary die and movable by the moving means at the time of die clamping in the backward direction away from the stationary die as to protrude from the movable die by a second protrusion length relative to the molding surface, approximately equal to the thickness of the disc substrate at the time of die clamping.

* * * * *